United States Patent [19]

Takayama

[11] Patent Number: 4,628,271
[45] Date of Patent: Dec. 9, 1986

[54] DIFFERENTIAL PHASE SHIFT KEYING DEMODULATOR

[75] Inventor: Makoto Takayama, Kanagawa, Japan

[73] Assignee: Canon Kabushiki Kaisha, Tokyo, Japan

[21] Appl. No.: 667,015

[22] Filed: Nov. 1, 1984

[30] Foreign Application Priority Data

Nov. 2, 1983 [JP] Japan ................... 58-206443
Nov. 2, 1983 [JP] Japan ................... 58-206446

[51] Int. Cl.⁴ .......................... H04L 27/22
[52] U.S. Cl. ........................ 329/50; 329/104; 329/137; 329/145; 329/122; 375/82; 375/84; 375/94
[58] Field of Search ............. 329/50, 104, 105, 107, 329/110, 137, 145, 122; 375/80, 82, 83, 84, 87, 94

[56] References Cited

U.S. PATENT DOCUMENTS

| | | | |
|---|---|---|---|
| 3,022,461 | 2/1962 | Wilcox, Jr. | 329/145 X |
| 3,028,487 | 4/1962 | Losee | 375/81 X |
| 3,470,478 | 9/1969 | Crafts | 375/83 X |
| 3,778,727 | 12/1973 | Williams | 329/145 X |
| 3,980,824 | 9/1976 | Lamb et al. | 375/81 X |

Primary Examiner—Siegfried H. Grimm
Attorney, Agent, or Firm—Toren, McGeady, Stanger, Goldberg & Kiel

[57] ABSTRACT

A differential phase shift keying demodulator in which a signal modulated by differential phase shift keying is compared with the modulated signal delayed an integral number times as much as a period of the carrier wave of the modulated signal and shorter than a transmission period for one bit of the modulated signal.

18 Claims, 41 Drawing Figures

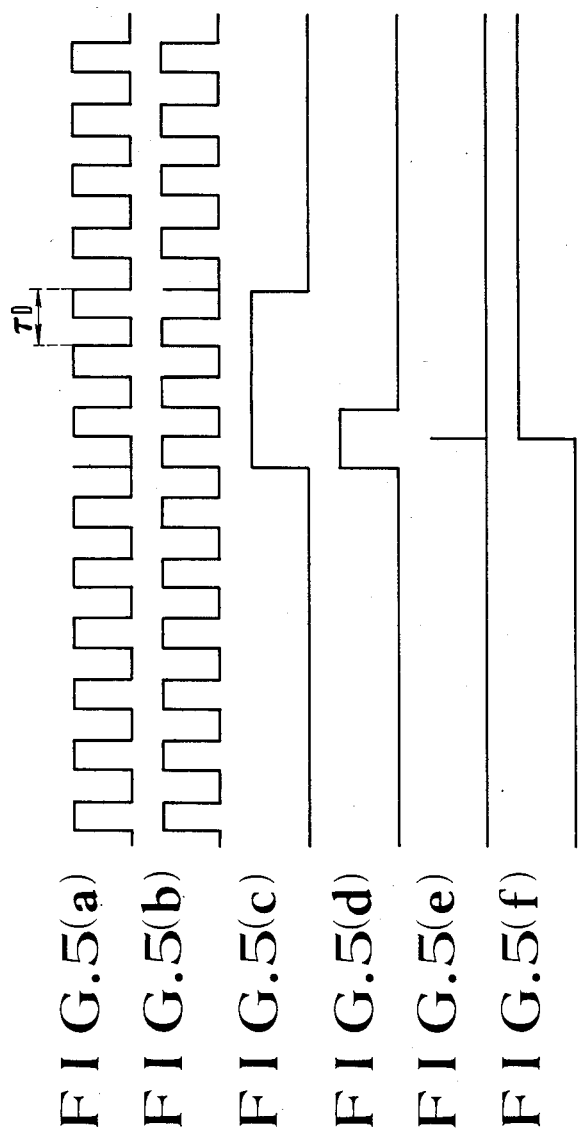

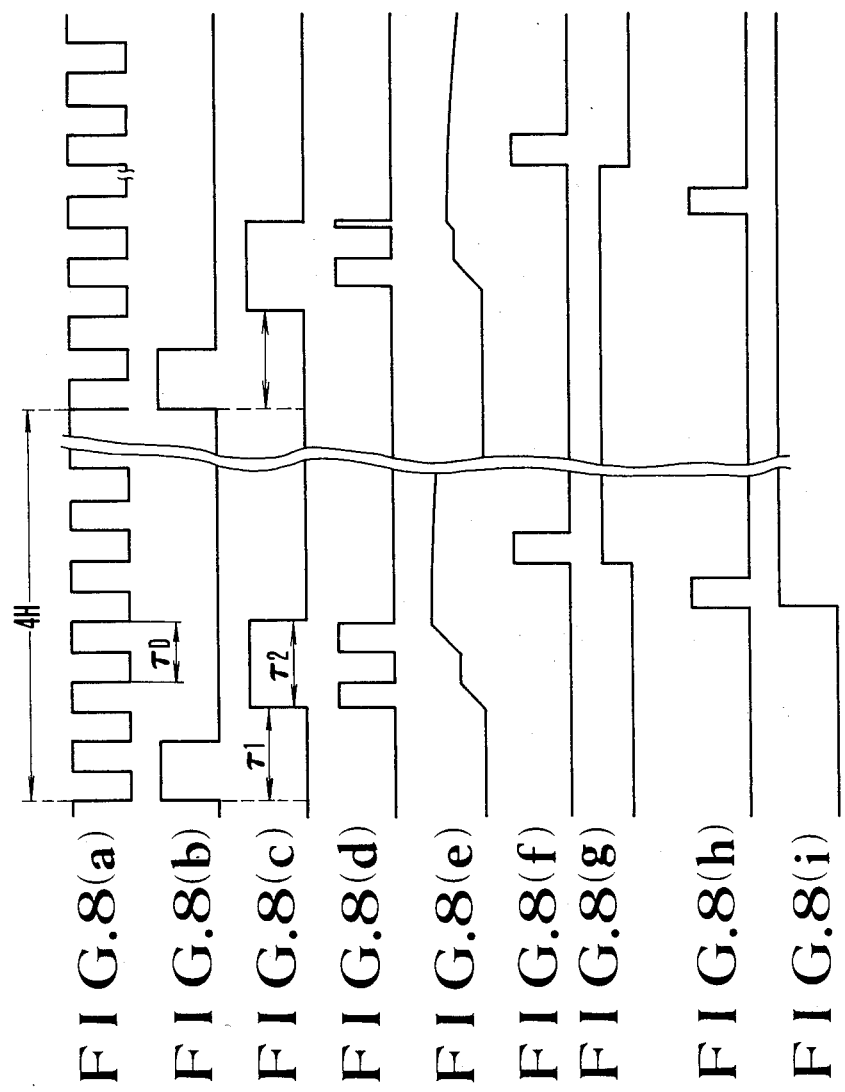

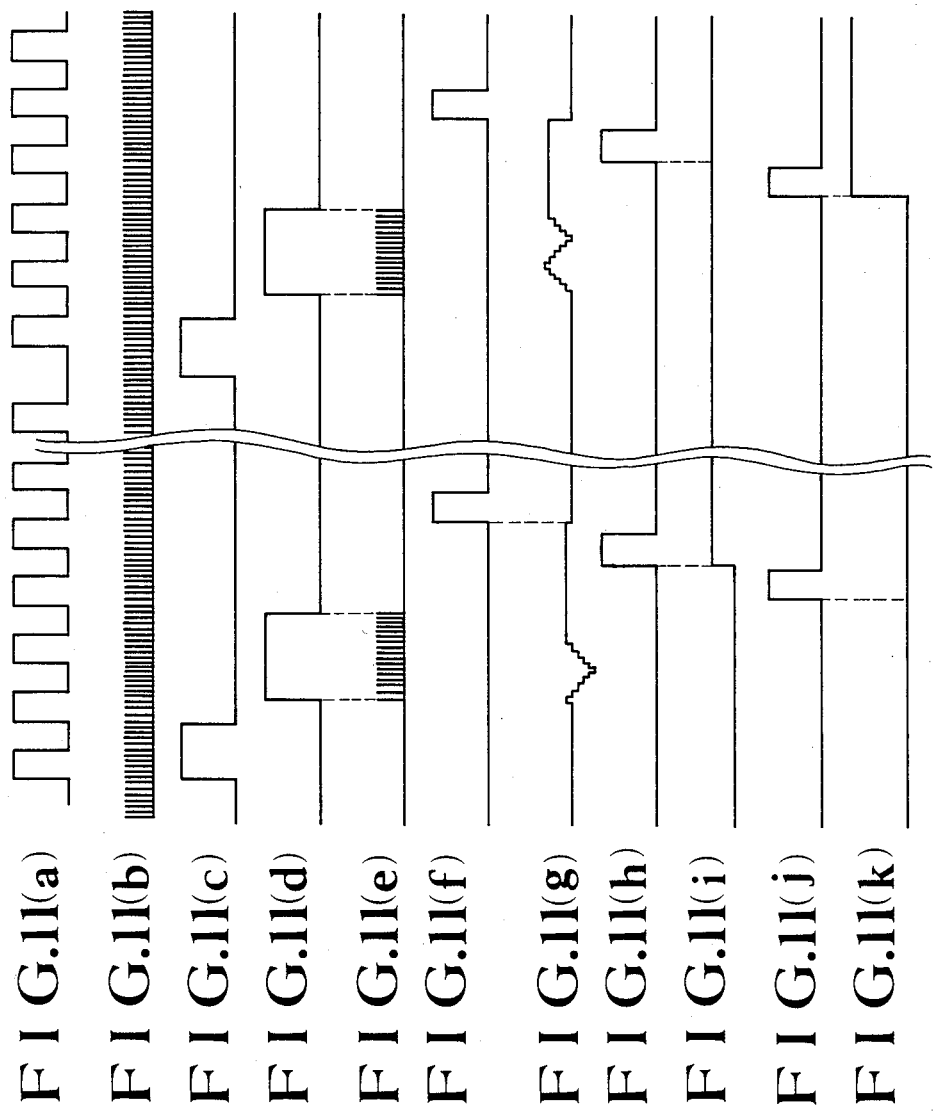

DIFFERENTIAL PHASE SHIFT KEYING DEMODULATOR

BACKGROUND OF THE INVENTION

1. Field of the Invention

This invention relates to a differential phase shifting keying demodulator.

2. Description of the Prior Art

The following description deals with a device for demodulating a differential phase shift keying signal (hereinafter referred to as a DPSK signal) which is synchronized with a video signal. FIGS. 1(a)–1(d) of the accompanying drawings illustrate the DPSK signal synchronized with a video signal. Of these drawings, FIG. 1(a) shows information data before modulation. The information data transmits the data of one bit during 4 horizontal scanning periods (hereinafter the horizontal scanning period will be called H period for short). FIG. 1(b) shows the differential data of the information data of FIG. 1(a). When the information data is "0", the differential data remains the same as the data obtained immediately before the "0" information data. When the information data is "1", the differential data is inverted from the data obtained immediately before it. FIG. 1(c) shows the video signal. FIG. 1(d) shows the DPSK signal. As is apparent from the time expanded illustration part on the right-hand side of FIGS. 1(a)–1(d), the DPSK signal of FIG. 1(d) has its phase inverted as the differential data signal of FIG. 1(b) changes between "1" and "0" while its frequency remains unchanged. Let us assume here that the DPSK signal is in a predetermined phased relation to the horizontal synchronizing signal of the video signal shown in FIG. 1(c).

Heretofore, for demodulating this type of DPSK signal, a circuit which is arranged as shown in FIG. 2 has been used. Referring to FIG. 2, the circuit includes a terminal 1 which receives the DPSK signal; a phase-locked loop (hereinafter referred to as PLL) circuit 2 produces a signal which has its phase coincident with that of the DPSK signal supplied to the terminal 1 and has a frequency twice as high as that of the DPSK signal; a ½ frequency divider 3; a comparator 4 to compare the DPSK signal with the output of the frequency divider 3; a demodulator 5 to obtain original information data from differential data; and an output terminal 6 to produce reproduced information data therefrom.

FIGS. 3(a)–3(e) show, in a timing chart, the wave forms of parts "a"–"e" of FIG. 2. As is apparent from FIG. 3(c), the ½ frequency divider 3 produces a signal which is of the same frequency as that of the DPSK signal and the signal has an unvarying phase. The comparator 4 produces a high level output when the phase difference between two input signals thereof is 180 degrees. Accordingly, the level of the output of the comparator 4 becomes high only when the DPSK signal is inverted relative to the signal produced from the ½ frequency divider 4 to give the above differential data of the original information data. The demodulator 5 samples the output of the comparator 4 at every 4H period, i.e. at every period during which one bit portion of data is transmitted. The demodulator 5 thus inverts the output data of the comparator 4 when the sampled output thereof is at a high level. Therefore, the original information data can be obtained from the demodulator 5.

However, in carrying out demodulation with the conventional device which is arranged as described above, the original data is demodulated after the differential data of the data is obtained. This arrangement results in a complex circuit arrangement. Furthermore, since the conventional demodulating device necessitates the use of the PLL circuit 2, the frequency divider 4, etc., this inevitably results in an increase in the scale of the circuit arrangement of the demodulating device.

It is an object of this invention to provide a demodulating device which deletes the drawback of the prior art device described above and is capable of demodulating, in an extremely simple manner, a modulated signal which has been phase shifted in relation to a differential signal of information data.

It is another object of the invention to provide a demodulating device capable of demodulating a modulated signal which has been phase shifted in relation to a differential signal of information data to directly restore the signal into information data obtained prior to modulation.

The above and further objects and features of the invention will become apparent from the following detailed description of embodiments thereof taken in conjunction with the accompanying drawings.

SUMMARY OF THE INVENTION

To attain the objects of the invention, a demodulating device embodying an aspect of the invention and arranged to demodulate a modulated signal which is phase shifted in relation to a differential signal of information data includes delay means for delaying the modulated signal and comparison means for comparing an output signal of the delaying means and the modulated signal.

BRIEF DESCRIPTION OF THE DRAWINGS

FIGS. 5(a)–5(f) show, in a timing chart, the wave forms of parts shown in FIG. 4.

FIGS. 8(a)–8(i) show, in a timing chart, the wave forms of parts shown in FIG. 7.

FIGS. 11(a)–11(k) show, in a timing chart, the wave forms of parts shown in FIG. 10.

DETAILED DESCRIPTION OF THE PREFERRED EMBODIMENTS

Figures 1A, 1B, 1C, 1D:
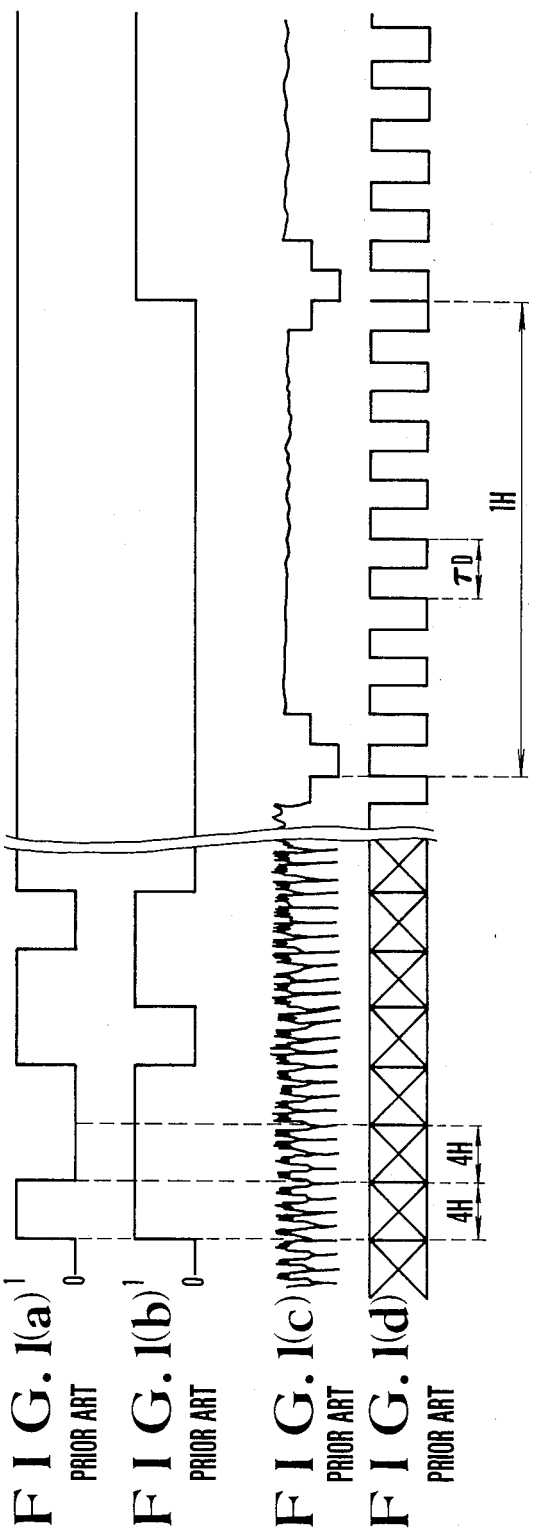
FIGS. 1(a)–1(d) are charts showing a DPSK signal.
Figure 2:
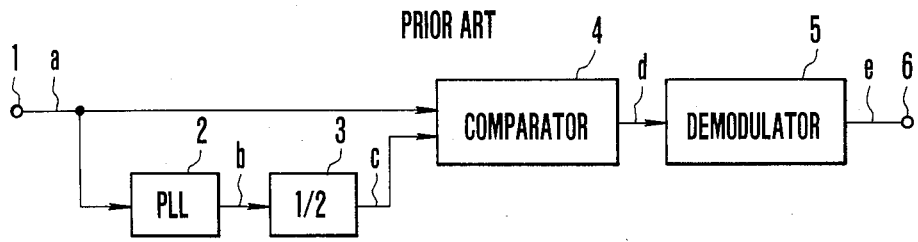
FIG. 2 is a diagram showing the circuit arrangement of a prior art device for demodulating a DPSK signal.
Figure 4:
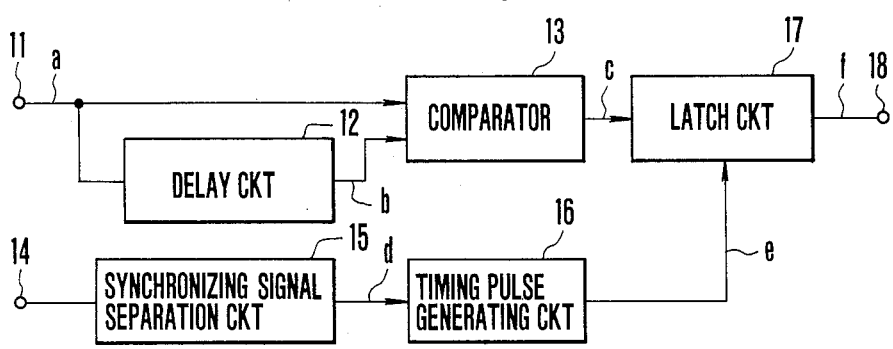
FIG. 4 is a diagram showing a DPSK signal demodulating device arranged according to the invention in an embodiment thereof.
Figures 3A, 3B, 3C, 3D, 3E:
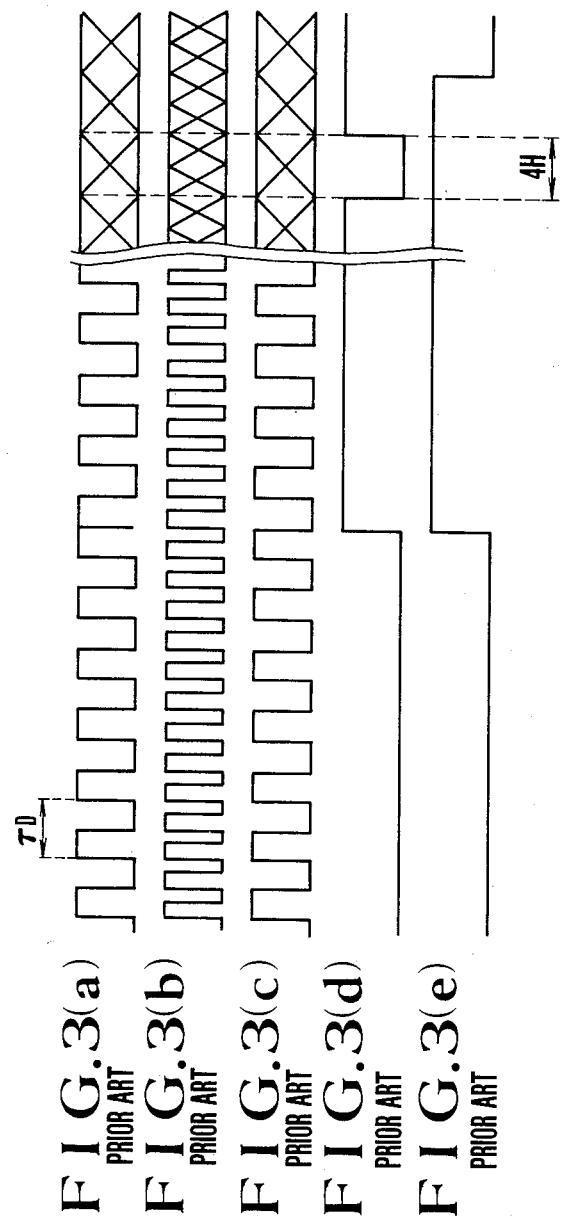
FIGS. 3(a)–3(e) show, in a timing chart, the wave forms of parts shown in FIG. 2.

The details of the present invention will be understood from the following description of some embodiments of the invention:

FIG. 4 shows the essential circuit elements of a DPSK signal demodulating device arranged according to the invention in an embodiment thereof. FIGS. 5(a)-5(f) show the wave forms of parts "a"-"f" of FIG. 4. Referring to these drawings, the demodulation circuit shown in FIG. 4 operates as follows:

The DPSK signal which is shown in FIG. 5(a) is supplied to a terminal 11. The signal is then supplied to a delay circuit 12 to be delayed there for a period which is an integral number of times as long as the period of the carrier wave of the DPSK signal as indicated by $\tau D$ in FIGS. 1(d), 3(a) and 5(a) and is three times as long as it is in the embodiment shown in FIG. 4. The delayed signal which is produced from this delay circuit 12, as shown in FIG. 5(b), and the DPSK signal which is received at the terminal 11, as shown in FIG. 5(a) are supplied to a comparator 13. The comparator 13 produces an output "1" when a phase difference between the two input signals is 180° and an output "0" when there is no phase difference between these input signals.

Another terminal 14 receives a video signal with which the DPSK signal is synchronized. A synchronizing signal separation circuit 15 separates a horizontal synchronizing signal, which is shown in FIG. 5(d), from the video signal. A timing pulse generating circuit 16 generates a timing pulse based on the horizontal synchronizing signal as shown in FIG. 5(e). Assuming that information data of one bit is transmitted during 4H periods, one timing pulse is generated at every 4H period. The signal produced (FIG. 5(c)) from the comparator 13 is caused by this timing pulse (FIG. 5(e)) to be latched at a latch circuit 17. The output of the latch circuit 17 becomes "1" only when the phase of the DPSK signal is inverted during the foregoing and ensuing 4H periods. Then, the DPSK signal is demodulated into the original information data, as shown in FIG. 5(f), and is produced from a terminal 18 of the demodulating device.

A period during which the comparator 13 produces an effective signal is equal to the time delayed by the delay circuit 12. Accordingly, the timing pulse is obtained within this effective period. The arrangement of this embodiment enables the device to directly demodulate the DPSK signal without recourse to a complex circuit arrangement including the PLL circuit 2, etc.

Furthermore, the delay time of the delay circuit 12 of FIG. 4 is 3 $\tau D$. However, if the delay time is a period of time required for transmitting the data of one bit (4H periods in the case of the embodiment described above, the output of the comparator 13 becomes the demodulated signal, of the DPSK signal as it is. Then, the device can dispense with the latch circuit 17, the synchronizing signal separation circuit 15 and the timing pulse generator 16.

In the event of a drop-out in the DPSK signal, a change in the time base, etc., the adverse effect of the drop-out or time base change can be suppressed by insertion of a low-pass filter (hereinafter referred to as LPF) between the comparator 13 and the latch circuit 17.

Figure 6:
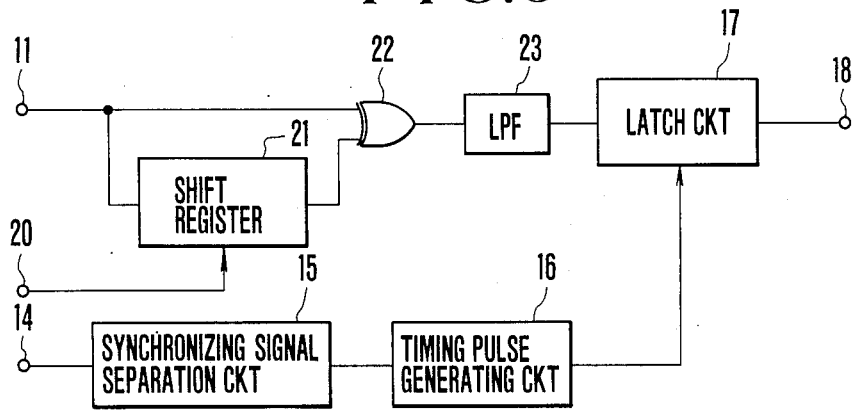
FIG. 6 is a diagram showing a DPSK signal demodulating device in another embodiment of the invention.

FIG. 6 shows a DPSK signal demodulating device arranged in another embodiment of the invention. In FIG. 6, the same component elements as those shown in FIG. 4 are identified by the same reference numerals and are omitted from the following description. The embodiment includes an input terminal 20 which receives clock pulses; a shift register 21 which operates according to the clock pulses; and an exclusive OR circuit 22 (hereinafter referred to as EXOR). The shift register 21 performs the same function as that of the delay circuit 12 of the preceding embodiment. The delay time of the shift register 21 is determined to be an integral number of times as long as the above-stated period $\tau D$ by the frequency of the clock pulse and the number of shift steps (the number of bits of the shift register 21). Furthermore, if the frequency of the clock pulses is sufficiently (at least two times) higher than that of the DPSK signal, the clock pulses do not have to be phase synchronized with the DPSK signal or the horizontal synchronizing signal of the video signal. In other words, the actual delay time $\tau D$ of the shift register 21 does not have to completely coincide with the time which is an integral number of times as much as the period $\tau D$. The EXOR 22 produces an output "1" only when the levels of the two input signals thereof differ from each other and otherwise has an output "0", in the same manner as the comparator 13 in the preceding embodiment. In the event that the phases of the clock pulses and the DPSK signal are not in agreement, the EXOR 22 does not always produce an effective output. However, since the output of the EXOR 22 is filtered by an LPF 23, it is readily determinable, within the delay time, whether the DPSK signal has been inverted. Furthermore, the cut-off frequency of the LPF 23 is lower than ½ the frequency of the DPSK signal.

The above-stated timing pulse causes the output of the LPF 23 to be latched by the latch circuit 17. The level of the output of the LPF 23 is relatively high within the delay time when the phase of the DPSK signal is inverted and relatively low when it is not inverted. With the threshold level of the latch circuit 17 set at a suitable value, the output can be caused to become "1" or "0" for demodulation back to the original information data. Furthermore, as in the preceding embodiment shown in FIG. 4, if the delay time of the shift register 21 is equal to the period for transmission of the data of one bit, the device deletes the necessity of using the latch circuit 17, the synchronizing signal separation circuit 15 and the timing pulse generating circuit 16. If the clock pulses which drive the shift register 21 are of a frequency an integral number of times as high as that of the DPSK signal and are phase synchronized with the DPSK signal, the LPF 23 is omissible. With the demodulating device arranged as shown in FIG. 6 and as described above, the DPSK signal can be demodulated with a simple circuit arrangement.

Figure 7:
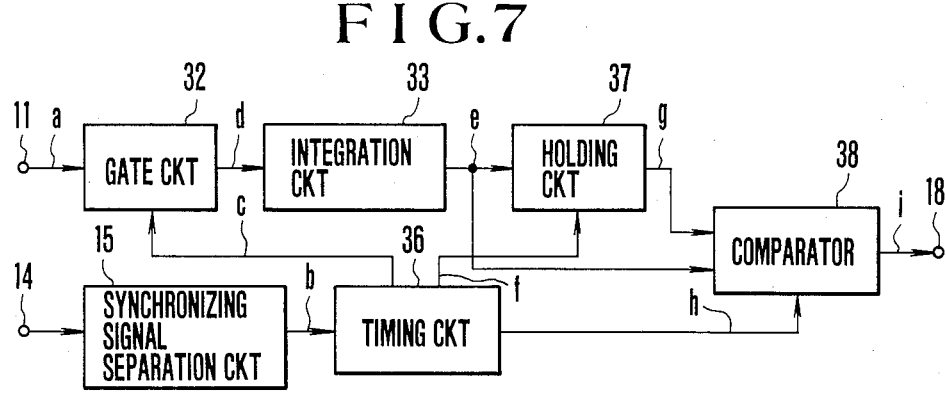
FIG. 7 is a diagram showing a DPSK signal demodulating device in a further embodiment of the invention.

FIG. 7 shows a DPSK signal demodulating device arranged in a further embodiment of the invention. FIGS. 8(a)-8(i) show, in a timing chart, the wave forms of parts "a"-"i" of FIG. 7. Referring to these drawings, the embodiment operates as follows: The DPSK signal which is as shown in FIG. 8(a) is supplied to the terminal 11 and is subjected to a gate operation performed by a gate circuit 32 for a predetermined period of time. The gate timing is determined by a timing circuit 36 based on a horizontal synchronizing signal which is separated from a video signal, by a synchronizing signal separation circuit 15, and is shown in FIG. 8(b). The timing circuit 36 produces a gate control signal which is shown in FIG. 8(c). If the data of one bit is transmitted in 4H periods, the timing circuit 36 produces one gate control signal at every 4H period. The gate control signal has a predetermined phase difference from the horizontal synchronizing signal, that is, a value $\tau 1$ shown in FIG. 8(c) is unvarying and the gate period thereof is also unvarying, as indicated by $\tau 2$ in FIG. 8(c). A comparison operation, which will be described later herein, might not be satisfactorily carried out if the selection of these values τ1 and τ2 is inappropriate. Therefore, it is preferable for the value τ1 that the rise in the gate control signal does not cause a fall nor a rise in the DPSK signal. For the value τ2, it is preferable that the value τ2 is not an integral number of times as much as the value τD. However, the comparison operation, which will be described later, can be carried out if either of the values τ1 and τ2 satisfies the above-stated conditions.

The DPSK signal, which is processed through the gate circuit 32 to become as shown in FIG. 8(d), is supplied to an integrator 33. The output of the integrator 33 is supplied to a holding circuit 37 and a comparator 38. At the comparator 38, the output of the integrator 33, which has been obtained during a preceding one-bit data transmission period (preceding 4H periods) and held at the holding circuit 37, is compared with the current or present output of the integrator 33. This comparison is performed after completion of the gate operation of the gate circuit 32 and before the holding operation of the holding circuit 37. The timing for the comparison is under the control of a signal which is produced from the timing circuit 36, as shown in FIG. 8(h). If the phase of the DPSK signal is inverted during two adjacent data transmission periods, the average levels of these periods differ from each other. In that case, the outputs of the integrator 33 differ from each other. If the phase remains the same, the outputs of the integrator 33 remain the same. The comparator 38 therefore produces an output "1" when there is a difference between two inputs thereof and an output "0" when the two inputs are equal to each other.

Upon completion of the comparison by the comparator 38, the current or present output of the integrator 33 is held by the holding circuit 37 for the next comparison process. As described in the foregoing, the integrated value of a signal obtained by subjecting the DPSK signal to a gate process performed for a predetermined period during two adjacent data transmission periods varies only when the phase of the DPSK signal changes. Therefore, the above-stated arrangement of this embodiment deletes the necessity for forming a signal of the same phase as that of the DPSK signal and also the necessity for obtaining a differential signal. The embodiment is therefore capable of demodulating the DPSK signal with a simple circuit arrangement.

Figure 9:
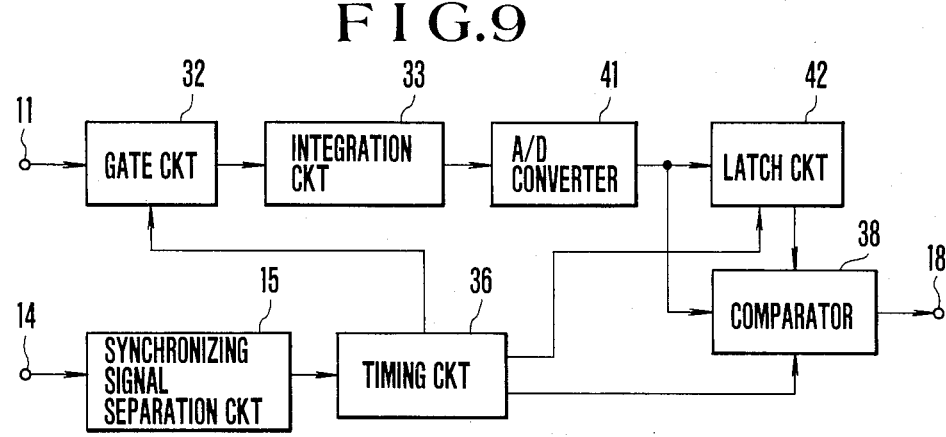
FIG. 9 is a diagram showing a DPSK signal demodulating device in a further embodiment of the invention.

FIG. 9 shows the DPSK signal demodulating device arranged in a further embodiment of this invention. The component elements similar to those shown in FIG. 7 are identified by the same reference numerals. The embodiment includes an analog-to-digital converter (hereinafter referred to as A/D converter) 41; and a latch circuit 42. As shown, the output of the integrator 33 is, in this case, supplied to the latch circuit 42 and to the comparator 38 after it is analog-to-digital (A/D) converted by the A/D converter 41. The latch circuit 42 latches the output of the A/D converter 41 after comparison completion by the comparator 38. At the comparator 38, the integrated value of the DPSK signal integrated over a predetermined period during the one-bit data transmission period is compared with the integrated value obtained during an adjacent one-bit data transmission period. The DPSK signal can thus be demodulated in the same manner as in the preceding embodiment shown in FIG. 7.

Figure 10:
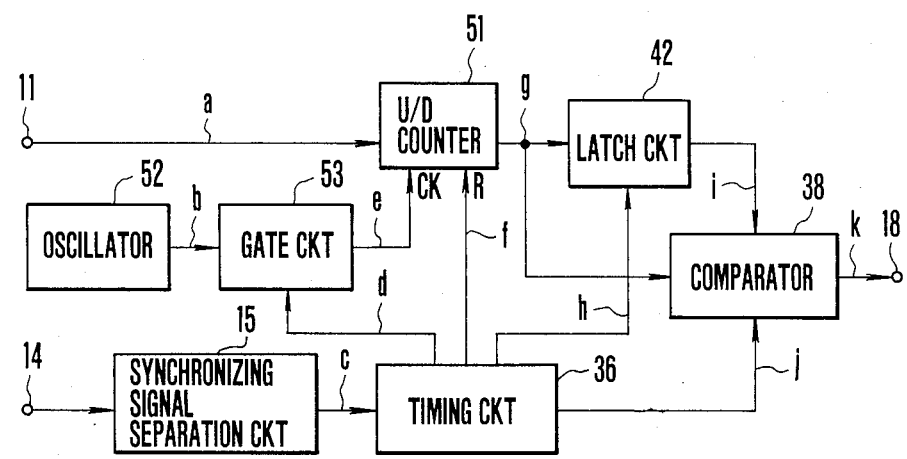
FIG. 10 is a diagram showing a DPSK signal demodulating device in a still further embodiment of the invention.

FIG. 10 shows the DPSK signal demodulating device in a still further embodiment of the invention. The component elements which are similar to those shown in FIG. 9 are identified by the same reference numerals.

Meanwhile, FIGS. 11(a)-11(k) show in a timing chart the wave forms of parts "a"-"k" shown in FIG. 10. The embodiment shown in FIG. 10 includes an up-down counter 51; an oscillator 52 which is arranged to produce clock pulses of a frequency sufficiently higher than that of the DPSK signal; and a gate circuit 53 which performs a gate operation on the clock pulses produced from the oscillator 52 and supplies them to the counter 51. The DPSK signal is supplied to the up-down control input terminal of the counter 51. Therefore, the output of the counter 51 becomes proportional to the average level of the DPSK signal obtained within a predetermined period during the data transmission period. The output of the counter 51 is supplied to the latch circuit 42 and the comparator 38. The comparator 38 demodulates the DPSK signal by comparing the outputs of the counter 51 obtained during adjacent data transmission periods in the same manner as in the preceding embodiments. The counter 51 is arranged to be reset by a reset pulse obtained by the timing circuit 36 as shown in FIG. 11(f) after completion of comparison by the comparator 38 and the latching action performed by the latch circuit 42. Since the output of the counter 51 is in proportion to the average level of the DPSK signal obtained within the above-stated predetermined period, the DPSK signal is demodulated through the comparator 38 in the same manner as in the preceding embodiments shown in FIGS. 7 and 9. The frequency of the clock pulses supplied to the counter 51 is preferably sufficiently higher than the frequency of the DPSK signal.

In the above-stated embodiment, the integrator and the up-down counter, etc. are employed as means for obtaining information corresponding to the average level of the DPSK signal obtained during a period designated by the gate. However, these circuit elements of course may be replaced with some other elements such as a latch circuit, an operational amplifier, etc.

What is claimed is:
1. A differential phase shift keying demodulator, comprising:
   (a) delay means for delaying a modulated signal, the delay time of said delay means being set at a value which is an integral number times as much as the period of the carrier wave of said modulated signal, and the delay time being shorter than a transmission period for one bit of said modulated signal; and
   (b) comparison means for comparing an output signal of said delay means and the modulated signal.
2. A demodulator according to claim 1, wherein both the output signal of said delay means and the modulated signal are of square wave forms; and said delay means includes a shift register.
3. A demodulator according to claim 1, wherein the level of the output signal of said comparison means becomes high when the output signal of said delay means and said modulated signal differ in phase.
4. A demodulator according to claim 3, wherein both the output signal of said delay means and the modulated signal are of square wave forms and said comparison means includes an exclusive OR circuit.
5. A differential phase shifting keying demodulator, comprising:
   (a) delay means for delaying a modulated signal;
   (b) comparison means for comparing an output signal of said delay means and the modulated signal; and

(c) a latch circuit arranged to latch the output signal of said comparison means at every transmission period for one bit of said modulated signal.

6. A demodulator according to claim 5, wherein said modulated signal is transmitted together with a first timing signal having an integral number of periods during the transmission period for one bit of said modulated signal, said demodulator further comprising timing control means responsive to said first timing signal for forming a second timing signal which determines timing for latching by said latch circuit.

7. A differential phase shift keying demodulator, comprising:
 (a) designating means for designating a predetermined period of time during every transmission period for one bit of said modulated signal;
 (b) means for forming an information signal relative to the average level of said modulated signal obtained within each of the periods designated by said designating means; and
 (c) comparison means for comparing information signals obtained within adjacent transmission periods for one bit of said modulated signal.

8. A demodulator according to claim 7, wherein said forming means includes an integration circuit which integrates the modulated signal obtained within each of the periods designated by said designating means.

9. A demodulator according to claim 8, wherein said comparison means includes a holding circuit which holds the output signal of said integration circuit for said transmission period and a comparator which compares the levels of the input and output signals of said holding circuit.

10. A demodulator according to claim 8, wherein said forming means further includes an analog-to-digital converter which analog-to-digital converts the output of said integration circuit.

11. A demodulator according to claim 10, wherein said comparison means includes a latch circuit which delays a data produced from said analog-to-digital converter for a period corresponding to said transmission period and a comparator which compares the data supplied to the latch circuit with a data produced from said latch circuit.

12. A demodulator according to claim 8, wherein said designating means includes a gate circuit which performs a gate operation on said modulated signal for a predetermined length of time during every said transmission period and supplies the modulated signal to said integration circuit.

13. A demodulator according to claim 7, wherein said forming means includes an oscillation circuit which generates a clock signal of a frequency sufficiently high relative to the carrier wave of said modulated signal and a counter which counts said clock signal for a period designated by said designating means; and the counting operation of said counter is controlled by the level of said modulated signal.

14. A demodulator according to claim 13, wherein said modulated signal is a square wave signal; and said counter counts upward said clock signal when said modulated signal is at a high level and counts down the clock signal when said modulated signal is at a low level.

15. A demodulator according to claim 13, wherein said comparison means includes a latch circuit which delays the data produced from said counter for a period corresponding to said transmission period and a comparator which compares the data supplied to the latch circuit with a data produced from said latch circuit.

16. A demodulator according to claim 13, wherein said designating means includes a gate circuit which performs a gate operation on said clock signal for a predetermined length of time during every said transmission period and supplies the clock signal to said counter.

17. A demodulator according to claim 7, wherein said modulated signal is transmitted together with a first timing signal having an integral number of periods during said transmission period, said demodulator further comprising timing control means responsive to said first timing signal for forming a second timing signal which determines a period to be designated by said designating means.

18. A demodulator according to claim 17, wherein said timing control means is further arranged to form a third timing signal which determines a timing for comparison to be performed by said comparison means.

* * * * *